United States Patent
Hibbs et al.

(10) Patent No.: US 10,557,493 B1
(45) Date of Patent: Feb. 11, 2020

(54) SPRING FASTENER

(71) Applicant: Arista Networks, Inc., Santa Clara, CA (US)

(72) Inventors: Richard Hibbs, Santa Clara, CA (US); Robert Wilcox, Santa Clara, CA (US); Victor Safradin, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 260 days.

(21) Appl. No.: 15/272,040

(22) Filed: Sep. 21, 2016

(51) Int. Cl.
F16B 19/00 (2006.01)
F16B 21/08 (2006.01)
F16B 5/06 (2006.01)

(52) U.S. Cl.
CPC ............ F16B 21/08 (2013.01); F16B 5/0621 (2013.01)

(58) Field of Classification Search
CPC ................................ F16B 21/06; F16B 21/08
USPC ...... 411/508, 522; 257/E23.086; 29/52, 525, 29/528; 267/169
See application file for complete search history.

(56) References Cited

U.S. PATENT DOCUMENTS

| | | | |
|---|---|---|---|
| 1,613,906 A * | 1/1927 | Rohour | F16B 41/002 362/382 |
| 3,795,317 A * | 3/1974 | Van Zon | B01D 61/08 210/321.87 |
| 6,055,159 A * | 4/2000 | Sun | H01L 23/4093 165/185 |
| 6,061,240 A * | 5/2000 | Butterbaugh | H01L 23/4093 165/80.2 |
| 6,219,244 B1 | 4/2001 | Chen | |
| 6,501,656 B1 * | 12/2002 | Peng | H01L 23/4093 248/510 |
| 6,679,712 B2 * | 1/2004 | Chang | H01L 23/4093 257/E23.086 |
| 6,697,256 B1 * | 2/2004 | Horng | H01L 23/4093 257/719 |
| 6,795,317 B1 * | 9/2004 | Liu | H01L 23/4093 165/80.3 |
| 6,865,083 B2 * | 3/2005 | Liu | H01L 23/4093 165/80.2 |
| 7,218,525 B2 | 5/2007 | Lo et al. | |
| 7,321,493 B2 | 1/2008 | Liang et al. | |
| 7,464,452 B2 * | 12/2008 | Yamamoto | B21J 15/046 29/505 |
| 7,729,122 B2 * | 6/2010 | Wong | H01L 23/4093 361/679.54 |
| 7,885,077 B2 | 2/2011 | Sass et al. | |
| 8,905,120 B2 * | 12/2014 | Tsai | H01L 23/427 165/67 |
| 9,354,003 B2 * | 5/2016 | Lin | F28F 99/00 |

(Continued)

Primary Examiner — Gary W Estremsky
(74) Attorney, Agent, or Firm — Fountainhead Law Group P.C.

(57) ABSTRACT

A spring fastener is provided. The spring fastener includes a spring and a flexible member having a shoulder, a first leg and a second leg. The first leg and the second leg are inserted through the spring along a longitudinal axis of the spring. The spring is retained to the flexible member by the shoulder and at least a portion of the first leg or the second leg. The first leg and the second leg have a retention feature to retain the spring fastener when the first leg and the second leg are inserted through an aperture in a component or a surface. A method of utilizing a spring fastener is also provided.

11 Claims, 6 Drawing Sheets

(56) References Cited

U.S. PATENT DOCUMENTS

2005/0254217 A1* 11/2005 Lo ...................... H01L 23/4093
          361/719
2018/0156256 A1* 6/2018 Okumura ................ F16B 19/00

* cited by examiner

SPRING FASTENER

BACKGROUND

Pushpins are commonly used for attaching a heat sink to a circuit board, so that the heat sink can help remove excess heat energy from a component. These are available in plastic or brass typically. Plastic pushpins suffer from long-term reliability, as a result of creep and aging. Brass pushpins, while not susceptible to creep and aging, do not have much springiness, and can damage circuit boards during installation. These situations are exacerbated on expensive circuit boards with large numbers of components and many pushpins. It is within this context that the embodiments arise.

SUMMARY

In some embodiments, a spring fastener is provided. The spring fastener includes a spring and a flexible member having a shoulder, a first leg and a second leg. The first leg and the second leg are inserted through the spring along a longitudinal axis of the spring. The spring is retained to the flexible member by the shoulder and at least a portion of the first leg or the second leg. The first leg and the second leg have a retention feature to retain the spring fastener when the first leg and the second leg are inserted through an aperture in a component or a surface.

In some embodiments, a spring fastener is provided. The spring fastener includes a spring and a shouldered member having at least two legs, formed by bending a flat piece that has a geometric center with a first leg and a second leg extending in opposed directions from the geometric center. At least one of the first leg or the second leg of the spring fastener includes a retention feature. The first leg and the second leg are arranged along a central, longitudinal axis of the spring with the spring retained by the shouldered member.

In some embodiments, a method of using a spring fastener is provided. The method includes positioning, at an aperture of a component or a circuit board, pointed ends of two prongs of a pronged flexible member that retains a spring. The method includes pressing the pronged flexible member so that the two prongs enter the aperture and the pointed ends of the two prongs move towards each other. The method includes continuing to press the pronged flexible member so that the spring compresses as a result of contact with the component or the circuit board, and a retention feature of the two prongs secures the spring fastener to the component or the circuit board.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Embodiments of a spring fastener disclosed herein have both spring properties and fastener properties, and can be used to fasten a heat sink or other component to a circuit board. Other uses may be devised. The spring fastener has a spring and a flexible member with two (or more, in some embodiments) legs, with a retention feature. In one embodiment, the retention feature has barbs on the ends of the legs, to both retain the spring and retain the fastener when inserted into an aperture, for example in a heat sink, a component or a circuit board.

Figure 1:
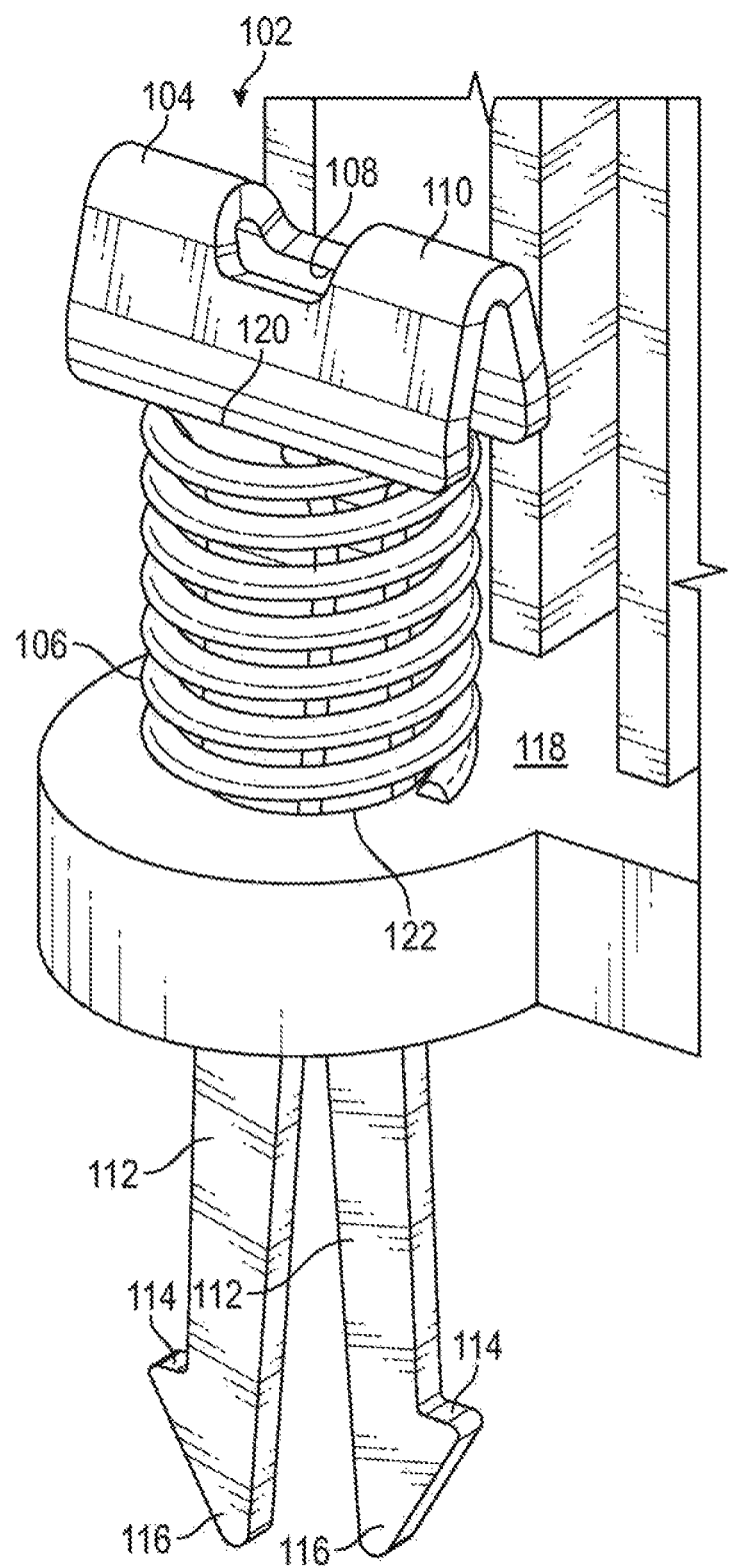
FIG. 1 is a perspective view of a spring fastener in accordance with some embodiments.

FIG. 1 is a perspective view of a spring fastener 102 in accordance with present embodiments. A flexible member 104 has a shoulder 120 and two legs 112 that retain a spring 106. Further embodiments could have more than two legs. Tips 116 of the two legs have barbs 114 that act as a retention feature. The retention feature helps retain the spring 106 to the flexible member 104 and also helps to retain the spring fastener 102 to a component 118 such as a heat sink and/or to retain the spring fastener 102 and the component 118 to a further component (e.g., an integrated circuit package needing heat removal) or a circuit board (to which the component 118 is fastened). The spring 106 is a coil spring in this embodiment, with the legs 112 inserted through the coil spring along a central, longitudinal axis of the coil spring. Further types of springs, including flat springs, V springs, leaf springs and compound springs with more than one element are envisioned.

An aperture 108 is defined in the head 110 of the spring fastener 102 along a bend portion of head 110. This configuration places the aperture 108 near or proximate to the shoulder 120, and not in the legs 112. The dimensions of the aperture 108 control the flexibility of the head 110 of the spring fastener 102, which in turn controls the flexibility of the spring fastener 102 in terms of pinching the legs 112 towards each other upon insertion of the tips 116 and legs 112 of the spring fastener into an aperture 122 in the component 118. Also, the aperture 108 in the head 110 of the spring fastener 102 can be dimensioned to fit a tool used in pressing on the spring fastener 102 to insert the spring fastener 102 into a component 118 or circuit board. In some embodiments, the aperture 108 appears as a notch in the head 110. A tool that has a projection that engages the aperture 108 or notch in the head 110 is readily devised.

Figure 2:
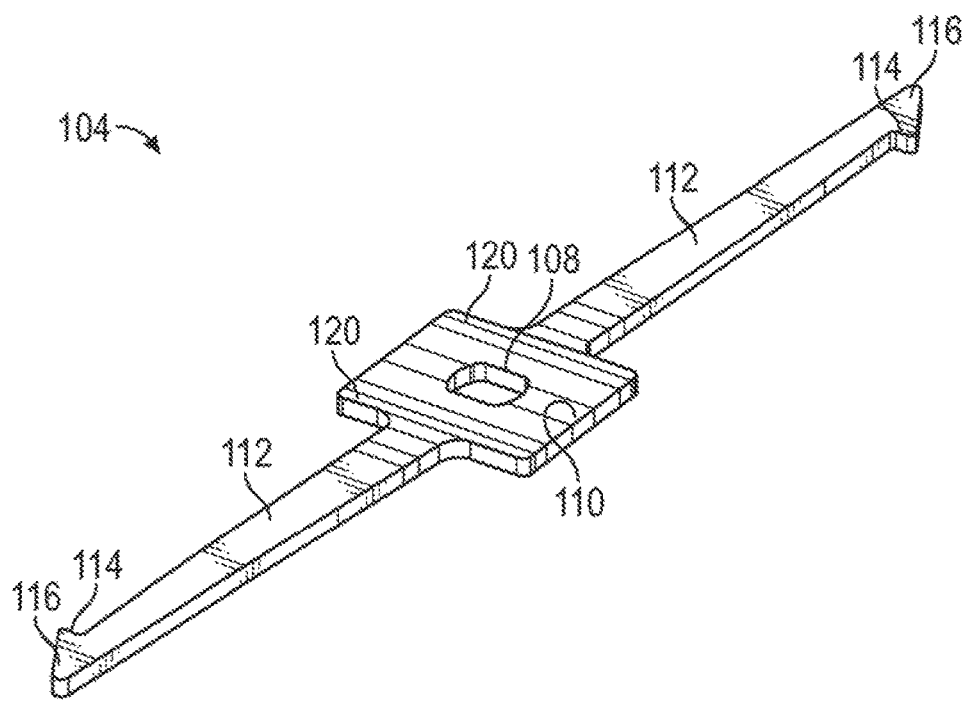
FIG. 2 is a perspective view of a shaped, flat piece that can be bent to form a flexible member for the spring fastener of FIG. 1 in accordance with some embodiments.

FIG. 2 is a perspective view of a shaped, flat piece that can be bent to form a flexible member 104 for the spring fastener of FIG. 1. The shaped, flat piece can be formed by stamping or otherwise cutting a flat sheet of metal, such as stainless steel, spring steel, other types of steel, brass, aluminum, etc., and bending along bend lines shown in FIGS. 1-4A and 5-7. These materials do not age or creep as does plastic, although an embodiment could be formed in plastic, fiberglass or other nonmetallic or composite material. As illustrated aperture 108 is formed in head 110 and the shaped flat piece can be bent along an axis of the aperture to form the flexible member 104.

Figure 3:
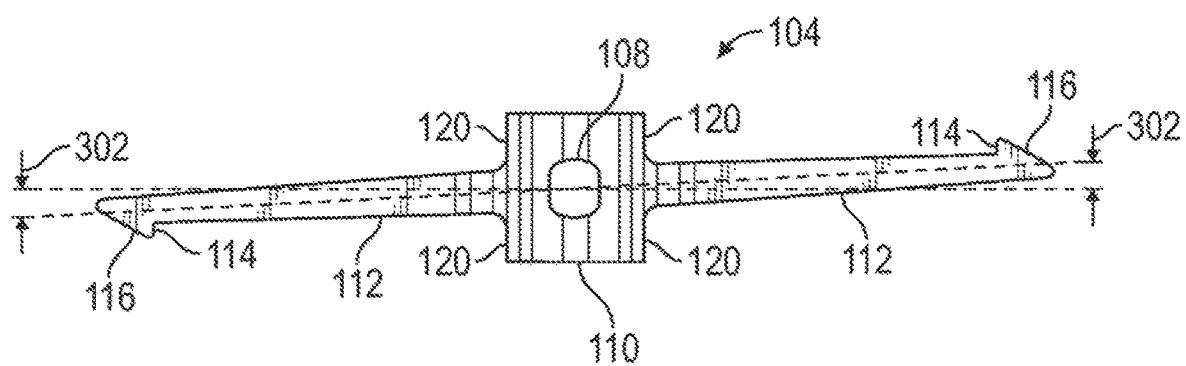
FIG. 3 is a top view of the shaped, flat piece of FIG. 2, showing two legs extending in opposed directions from a geometric center in accordance with some embodiments.
Figure 4A:
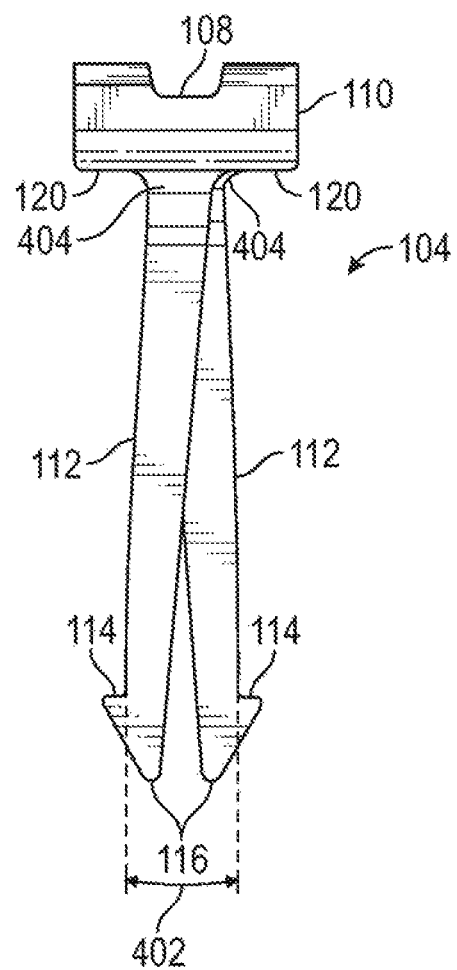
FIG. 4A is a side projected view of a flexible member of the spring fastener of FIG. 1, formed from the shaped, flat piece of FIGS. 2 and 3 in accordance with some embodiments.

FIG. 3 is a top view of the shaped, flat piece of FIG. 2, showing two legs 112 extending in opposed directions from a geometric center. The geometric center forms the head 110 of the flexible member 104, and has the aperture 108 in some embodiments. Edges along the boundary of the geometric center form the shoulder 120 of the flexible number 104. In some embodiments, each of the legs 112 is at a nonzero angle 302 from a centerline symmetrical longitudinal axis of the geometric center of the shaped, flat piece. This nonzero angle 302 gives the tips 116 of the legs 112 a lateral offset or spacing in the shouldered member 104, as seen in FIG. 4A. In some embodiments, the nonzero angle is about 3 degrees, however and nonzero angle may be utilized with the embodiments.

FIG. 4A is a side projected view of a flexible member 104 of the spring fastener 102 of FIG. 1, formed from the shaped, flat piece of FIGS. 2 and 3. In this embodiment, a base 404 of one of the legs 112 overlaps a base 404 of the other leg 112, where the legs 112 attach to the head 110 adjacent to the shoulder 120 of the flexible member 104. The lateral offset or spacing of the tips 116 of the legs 112 is visible in the side projected view. Also visible is a further nonzero angle 402 between the legs 112, arising from the nonzero angle 302 by which each leg is displaced from the centerline symmetrical longitudinal axis of the geometric center, as described above with reference to FIG. 3. As a result of the symmetrical folding of the geometric center to make the head 110 of the flexible member 104, the further nonzero angle 402 between the legs 112 in the side projected view is equal to twice the nonzero angle 302 associated with each leg 112. As illustrated in FIG. 4A, while the base 404 of one of the legs 112 overlaps the base 404 of the other leg 112 proximate to the head, tips 116 of the two legs 112 do not overlap in this embodiment.

Figure 4B:
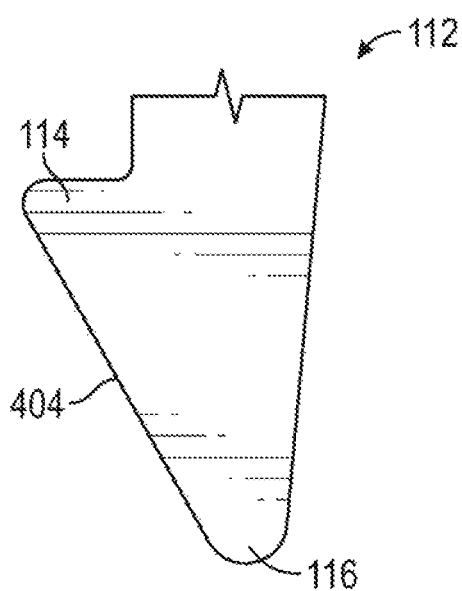
FIG. 4B is a close-up view of a barbed prong of the flexible member of FIG. 4A in accordance with some embodiments.

FIG. 4B is a close-up view of a barbed prong of the flexible member of FIG. 4A. In this embodiment, the leg 112 has a rounded tip 116, with a barb 114 that projects out laterally to the side of the tip 116 of the leg 112. The rounded tip allows the leg 112 to act as a prong, for easier insertion into an aperture of a component 118 or circuit board, in comparison to a squared off or blunt end of the leg. It should be appreciated that alternative tips, e.g., sharpened, etc. may be integrated with the embodiments. A beveled edge 404 is part of the tip 116 and the barb 114 of the leg 112, and acts to guide the tip 116 of the leg 112 into the aperture. Beveling, in opposed directions, on the tips 116 of both of the legs 112 is arranged to push the two legs 112 closer together upon insertion of the tips 116 into an aperture during installation of the spring fastener 102, as a result of the beveled edges 404 contacting edges of the aperture. With the flexible member 104 flexing so that the tips 116 of the legs 112 are thus squeezed closer together, the tips 116 and lower portion of the legs 112 can be pushed into the aperture in a component 118 or circuit board. Once the tips 116 are on the other side of the component or circuit board, a restoring force resulting from the flexing of the flexible member 104 acts to push apart the tips 116 of the flexible member 104, so that the barbs 114 or other retention feature can move outward and press against that other side of the component or circuit board. This retains the spring fastener 102 to the component or circuit board. In further embodiments, the retention feature could be a hook, an L-bend, a latch, a ball, wings, a friction fit, a wedge, a slip on sheath, screw threads, threads for a nut, a cap, a bendable section, a twist tie, an aperture for insertion of a crossbar, or other feature that performs the functionality of retaining the spring fastener 102.

Figure 5:
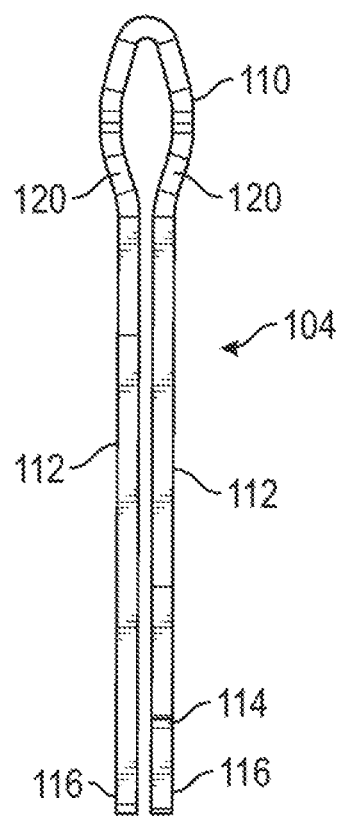
FIG. 5 is a side end projected view of the flexible member in accordance with some embodiments.

FIG. 5 is a side end projected view of the flexible member 104. Bends, along the bend lines, can be seen shaping the head 110 and placing the legs 112 in plane parallel arrangement, with a spacing offset between the legs 112 in the side end projected view. One barb 114, on the right, projects upwards out of the page in the drawing, the other barb 114 is not visible as it projects downward from the page in the drawing. Orientation of the barbs could readily be switched right to left in a variation, with a barb 114 on the left projecting upwards out of the page and a barb on the right projecting downward from the page. Head 110 is illustrated as having an elliptical shape in this side view. In other embodiments, alternative shapes, such as triangular, etc., may be integrated into the embodiments.

Figure 6:
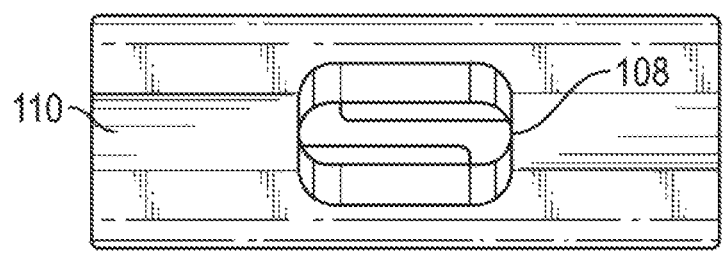
FIG. 6 is a top projected view of the flexible member in accordance with some embodiments.

FIG. 6 is a top projected view of the flexible member 104. The aperture 108 and relationship to remaining material of the head 110 of the flexible member 104 is visible. Removing more material, to enlarge the aperture 108, would leave less material available for the head 116, and decrease the amount of force needed to flex the head during displacement of the tips 116 and legs 112. Conversely, shrinking the aperture 108 and leaving more material in the head 110 would increase the amount of force needed to flex the head during displacement of the tips 116 and legs 112. The dimensions of the aperture 108 can thus be varied to control flexure of the flexible member 104, for various materials. In some embodiments, the flexure of the flexible member 104 is tuned to be greater than flexure of a standard pushpin for a given amount of insertion force. It should be appreciated that this tuned embodiment protects against damage in circuit boards during assembly of the spring fastener 102 to a circuit board. As illustrated in FIG. 6, the head 110 is bent along an axis of the aperture, although this is not meant to be limiting as the axis of the aperture may be offset from the bend line of the head, to one side of the middle in other embodiments. In addition to or instead of adjustment to the dimensions of the aperture 108, adjustment of the geometry of the legs 112 and/or the angle of the prongs 114 affects the amount of force needed to flex the flexible member 104 during displacement of the tips 116 and legs 112. For example, if the legs 112 have a wide root (at the shoulder 120) and are narrower near the prongs 114, the legs 112 flex more at the tips 116, which helps distribute stress better. Also, by adjusting the prong ramp angle, the amount of friction between the tips 116 of the legs 112 and edges of a hole can be controlled. In some embodiments, the prong ramp angle is minimized.

Figure 7A:
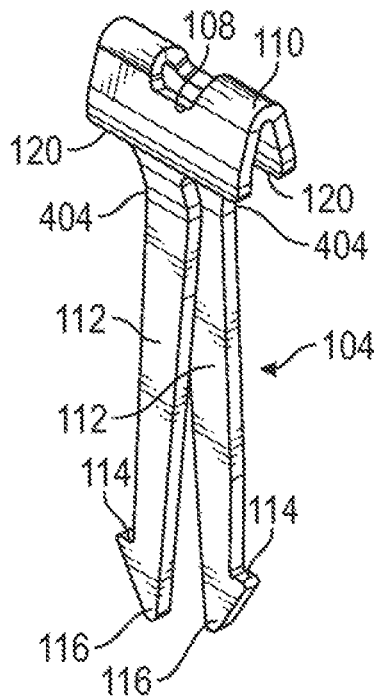
FIG. 7A is a perspective view of the flexible member in accordance with some embodiments.

FIG. 7A is a perspective view of the flexible member 104 without the spring 106. Keeping in mind the shaping of the flexible member 104 from the bending of the flat piece shown in FIGS. 2 and 3, and referring to FIGS. 1 and 7, assembly of the spring fastener 102 is readily envisioned.

The two legs 112 of the flexible member 104 are squeezed closer together, the tips 116 of the two legs 112 are inserted into the spring 106 from one end of the spring, and the coils of the spring 106 are pressed onto the legs 112, or the legs 112 are pressed down into the coils of the spring 106. Once the tips 116 of the legs 112 emerge from the other end of the spring 106, the tips 116 and legs 112 move apart slightly, and the shoulder 120 and the legs 112 and/or the barbs 114 retain the spring 106 to the flexible member 104.

Figure 7B:
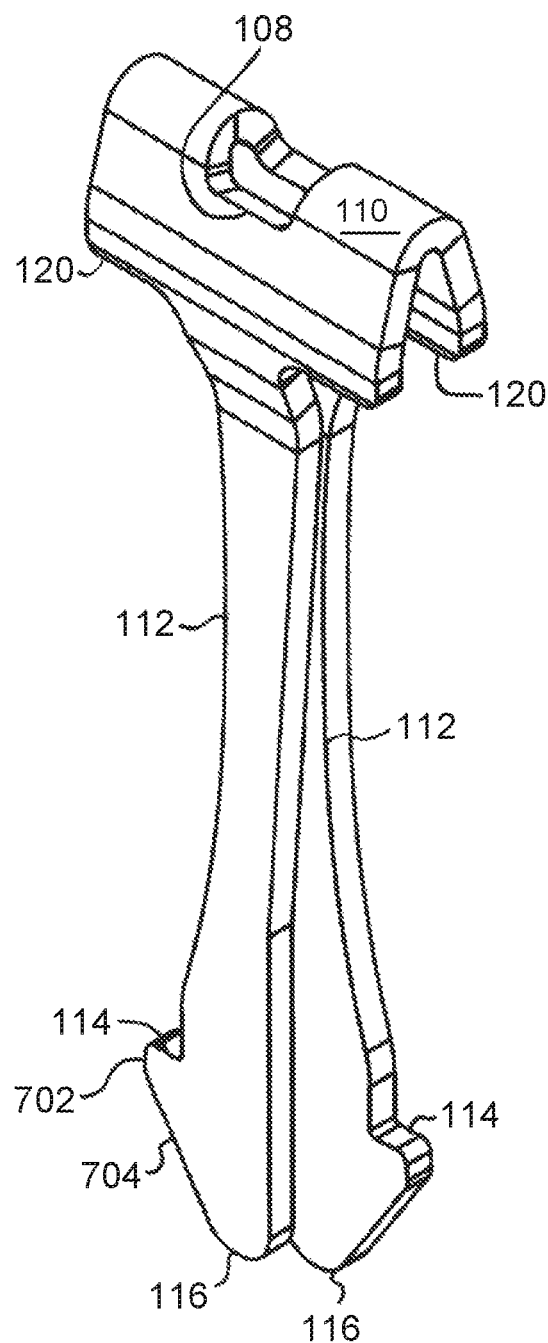
FIG. 7B is a perspective view of a further embodiment of the flexible member of the spring fastener.

FIG. 7B is a perspective view of a further embodiment of the flexible member 104 of the spring fastener 102. The legs 112 overlap all the way to the tips 116, i.e., for the entirety of the lengths of the legs 112 there is overlap from one leg 112 to the other leg 112. This forces the legs 112 to slide with respect to each other during installation of the spring fastener 102, which eliminates the legs 112 bumping into each other and also reduces insertion forces. Also visible is a vertical section 702 before the prong ramp angle 704, so that the prong 114 has an increased contact area at that location when contacting the edge of the hole into which the spring fastener 102 is inserted during assembly. This reduces scratches in the component or printed circuit board into which the spring fastener 102 is inserted.

Figure 8:
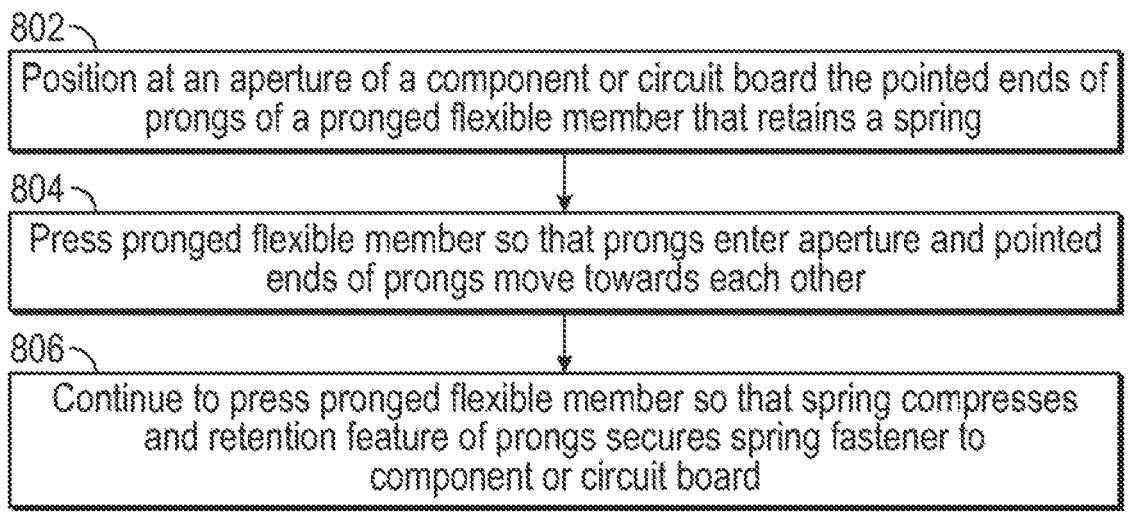
FIG. 8 is a flow diagram of a method of using a spring fastener, which can be performed using the spring fastener of FIGS. 1-7 in accordance with some embodiments.

FIG. 8 is a flow diagram of a method of utilizing a spring fastener, which can be performed using the spring fastener of FIGS. 1-7. In an action 802, pointed ends of prongs of a pronged spring fastener are positioned at an aperture of a component or a circuit board. In an action 804, the pronged flexible member is pressed so that the prongs enter the aperture and the pointed ends of the prongs move towards each other. In an action 806, the pronged flexible member continues to be pressed so that the spring compresses and a retention feature of the prongs secures the spring fastener to the component or circuit board. In a variation of the method, a tool is engaged to a notch or an aperture of the pronged flexible member, and used in pressing the pronged flexible member. It should be appreciated that the pronged spring fastener can secure a heat sink to a circuit board without use of an anchor bar as required by other types of fasteners.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry or mechanical features) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits or manufactured articles) that are adapted to implement or perform one or more tasks, or designing an article or apparatus to have certain features or capabilities.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A spring fastener, comprising:

a spring;

a shouldered member having at least two legs, formed by bending a flat piece that has a geometric center with a first leg and a second leg extending in opposed directions from the geometric center, wherein the flat piece has an aperture dimensioned to control flexure of the shouldered member;

at least one of the first leg or the second leg having a retention feature; and the first leg and the second leg arranged along a central, longitudinal axis of the spring with the spring retained by the shouldered member, wherein the flat piece is formed by stamping a flat sheet of metal to create the flat piece with the first leg and the second leg each offset by an angle from a symmetrical longitudinal axis of the geometric center of the flat piece.

2. The spring fastener of claim 1, wherein the retention feature includes a barb.

3. The spring fastener of claim 1, wherein the flat piece is cut and bent from a flat sheet of material.

4. The spring fastener of claim 1, wherein the aperture is proximate to a shoulder.

5. The spring fastener of claim 1, wherein the shouldered member and the spring are configured to secure a heat sink to a circuit board without use of an anchor bar.

6. The spring fastener of claim 1, wherein the first leg is at a nonzero angle with respect to the second leg.

7. The spring fastener of claim 1, wherein each of the first leg and the second leg is a beveled prong with a barb.

8. A spring fastener, comprising:
 a spring;
 a shouldered member having at least two legs, formed by bending a flat piece that has a geometric center with a first leg and a second leg extending in opposed directions from the geometric center, wherein the flat piece has an aperture dimensioned to control flexure of the shouldered member;
 at least one of the first leg or the second leg having a retention feature; and
 the first leg and the second leg arranged along a central, longitudinal axis of the spring with the spring retained by the shouldered member, wherein:
  a shoulder of the shouldered member secures a first end of the spring; and
  an opposed second end of the spring is secured to the shouldered member by the retention feature or by the first leg and the second leg.

9. The spring fastener of claim 8, wherein the at least one of the first leg or the second leg having a retention feature comprises:
 the first leg having a first barb; and
 the second leg having a second barb.

10. The spring fastener of claim 8, wherein the aperture is dimensioned to engage a tool to the spring fastener.

11. A spring fastener, comprising:
 a spring;
 a shouldered member having at least two legs, formed by bending a flat piece that has a geometric center with a first leg and a second leg extending in opposed directions from the geometric center, wherein the flat piece has an aperture dimensioned to control flexure of the shouldered member;
 at least one of the first leg or the second leg having a retention feature; and
 the first leg and the second leg arranged along a central, longitudinal axis of the spring with the spring retained by the shouldered member, wherein:
  a base of the first leg overlaps a base of the second leg in the shouldered member; and
  a tip of the first leg is spaced apart from a tip of the second leg in the shouldered member.

* * * * *